United States Patent [19]

Nichols

[11] 4,314,410
[45] Feb. 9, 1982

[54] ANIMAL DRYER

[75] Inventor: Margaret W. Nichols, Richardson, Tex.

[73] Assignees: Richard Smarzak; Winifred Wisner, both of Dallas, Tex. ; a part interest

[21] Appl. No.: 159,219

[22] Filed: Jun. 13, 1980

[51] Int. Cl.³ ............................................ F26B 25/06
[52] U.S. Cl. ..................................... 34/202; 34/233; 119/15
[58] Field of Search ............ 34/202, 233, 225, 243 R; 119/15, 158, 156, 1; 98/33 R

[56] References Cited

U.S. PATENT DOCUMENTS

| | | | |
|---|---|---|---|
| 3,175,534 | 3/1965 | Pollard | 119/1 |
| 3,286,370 | 11/1966 | Hope | 34/233 |
| 3,616,548 | 11/1971 | Nichols | 34/233 |
| 4,010,341 | 3/1977 | Ishammar | 34/233 |
| 4,206,554 | 6/1980 | Fowler | 34/233 |

Primary Examiner—Larry I. Schwartz
Attorney, Agent, or Firm—Head & Johnson

[57] ABSTRACT

An apparatus for containing and drying an animal having an enclosure formed of an upper and a lower section. The upper section is of a cage-like configuration formed from interconnected bars. The lower section has an inner housing disposed therein with the inner housing having opposed side and end panels and a flooring panel spaced from the side and end walls and flooring of the lower section. The inner housing is provided with a plurality of holes and a door is provided in one end of the enclosure to allow entrance and exit of the animal. A blower is connected to the lower section and forces heated air into the lower section and between the space between the lower section and the inner housing and through the holes in the inner housing to dry the animal contained therein.

21 Claims, 4 Drawing Figures

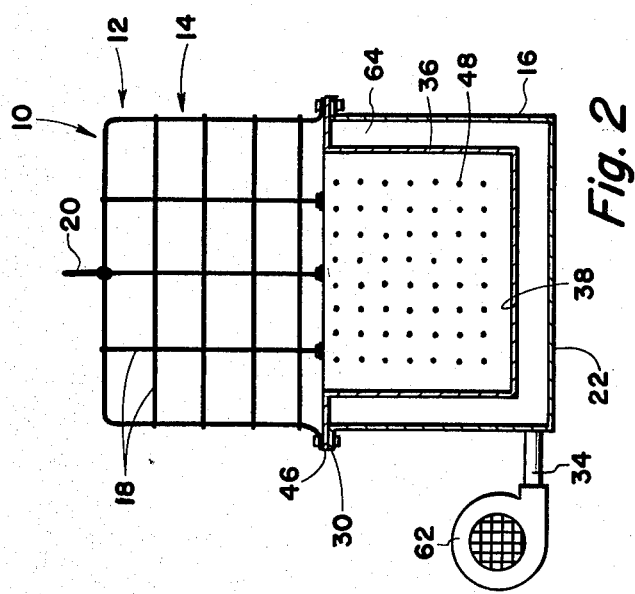
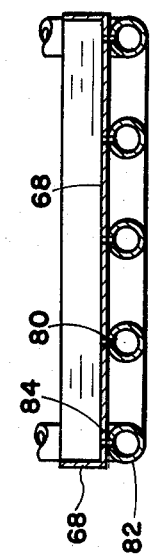
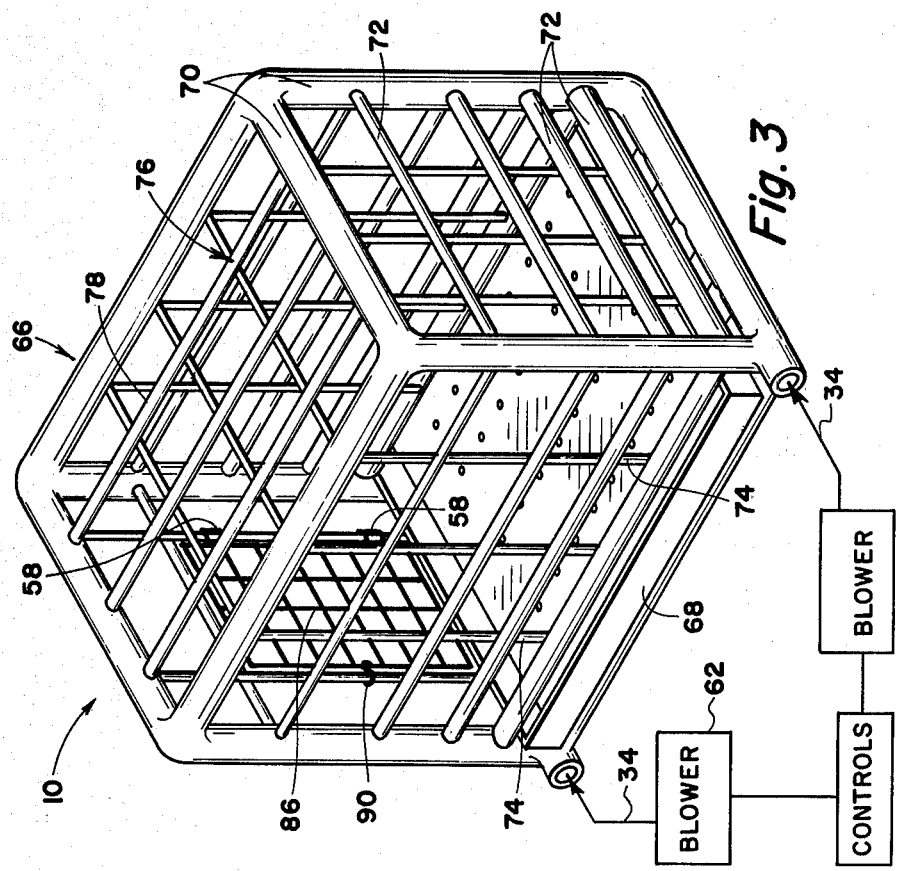

ANIMAL DRYER

BACKGROUND OF THE INVENTION

1. Field of the Invention

The present invention relates to an animal dryer and, more particularly, to such an apparatus which is an enclosure containing the animal and is provided with means to force hot air through the enclosure to dry the animal.

2. Description of the Prior Art

The bathing and grooming of domestic animals and particularly dogs can be a difficult and time consuming task. Many animal owners are reluctant to undertake the bathing and drying due to the lack of adequate ways to restrain and contain the animal as well as a lack of a fast and efficient drying mechanism. Veterinarians and operators of kennels often do not have the time or manpower necessary to adequately bath and dry the animals.

After an animal is bathed the hair of the animal must be dryed quickly and safely. There are inadequate hair drying devices in use today which either do not adequately dry the hair, so as to subject the animal to possible sickness, or may apply too great of heat to the hair which causes great discomfort to the animal. There do not appear to be any prior art devices which efficiently contain the animal and apply non-localized heated air to dry the animal quickly and thoroughly.

SUMMARY OF THE INVENTION

The present invention provides an apparatus for containing and drying an animal which is simple to operate, transport and safely and efficiently dries the hair of the animal.

The present invention is comprised of an enclosure having a lower section and a top section of a cage-like configuration, preferably made from interconnected metal bars. The lower section has an inner housing disposed therein which is spaced away from the walls and the flooring of the lower section and which further has a plurality of holes therein. An opening is provided in one end of the enclosure with a wire mesh door to allow entrance and exit of the animal from the enclosure. A forced air device is connected through at least one conduit to the lower section of the enclosure and forces hot air through the holes in the inner housing into the interior of the enclosure to dry the contained animal. The hot air device is provided with temperature and time controls to dry any type of animal correctly and quickly.

An alternate embodiment of the present invention comprises an enclosure constructed of different diameter interconnected conduits which form side and end panels and a top panel. The horizontal conduits are spaced progressively further apart from the flooring panel. The conduits have a plurality of holes therein which are directed towards the interior of the enclosure. A hot air device is connected to at least one of the larger diameter conduits so that hot air is forced through the system of conduits and out of the holes into the interior of the enclosure to dry the contained animal.

BRIEF DESCRIPTION OF THE DRAWINGS

FIG. 2 is a view taken along line 2—2 of FIG. 1 with a forced air means connected to the animal dryer;

FIG. 3 is a perspective view of an alternate embodiment of the present invention; and FIG. 4 is a close up view of a bottom portion of the embodiment of FIG. 3.

DETAILED DESCRIPTION OF THE PREFERRED EMBODIMENTS

Figure 1:
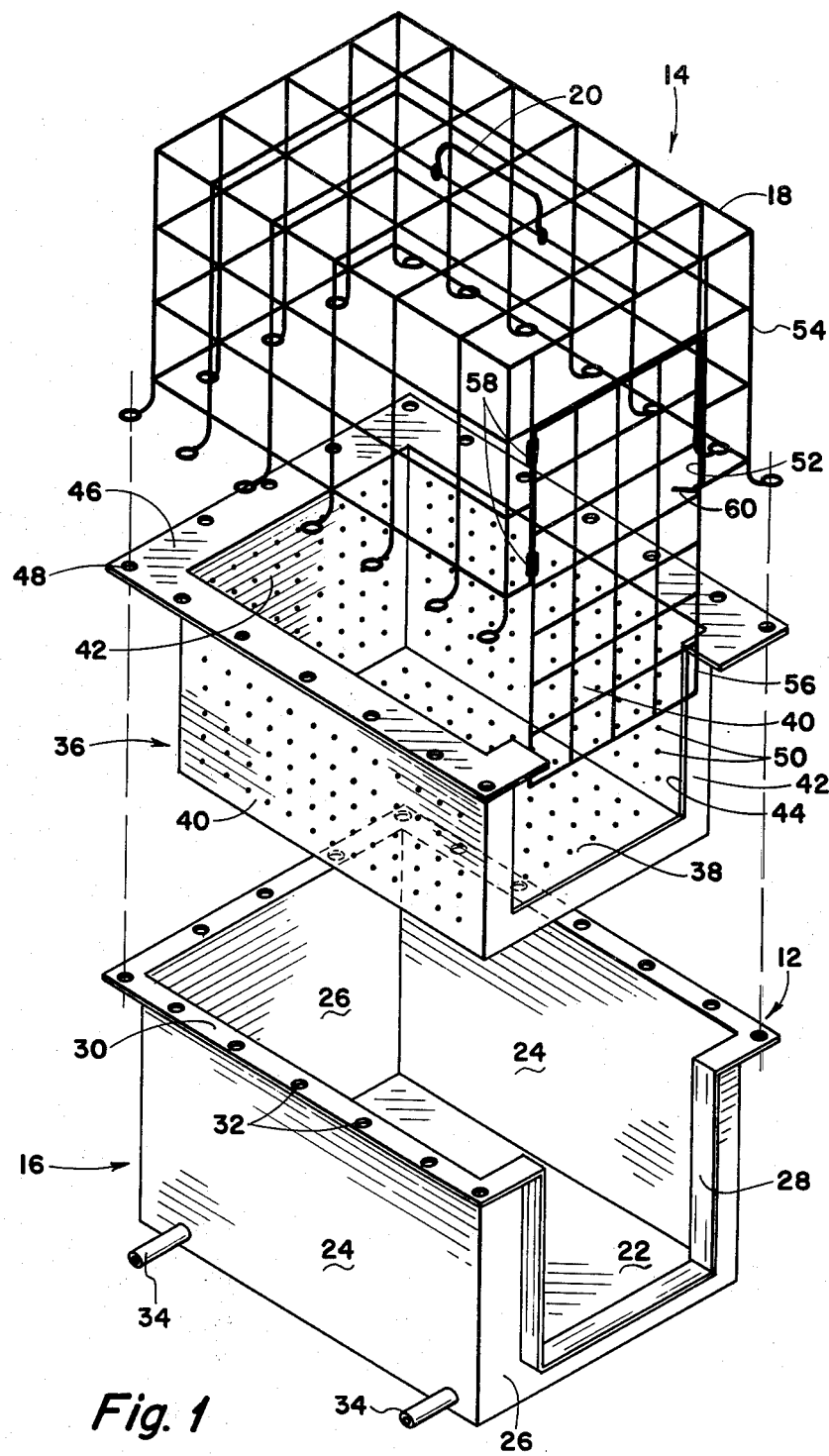
FIG. 1 is a perspective exploded view of an animal dryer embodying the present invention.

Referring to the drawings in detail, reference character 10 generally indicates an apparatus for containing and drying an animal, such as a dog or cat. As shown in FIG. 1, the apparatus 10 is generally comprised of an enclosure 12 having an upper section 14 and a lower section 16. The upper section 14 may be domed or rectangular in shape and is formed from a plurality of interconnected horizontal and vertical bars 18 to form a cage-like enclosure of an open bottom configuration. A collapsible handle 20 is connected to one of the bars 18 on the top surface of the upper section 14.

The rectangular lower section 16 is comprised of a bottom or flooring 22, interconnected opposed vertical side walls 24 and opposed vertical end walls 26, and may be constructed of wood, metal, fiberglass, or other suitable material. One of the end walls 26 is provided with a rectangular cut-out or opening 28. A rim 30, having a plurality of holes 32 spaced therein, extends around the top surface of the side walls 24 and end walls 26. A plurality of conduits 34 extend into the interior of the lower section 16 through openings (not shown) in one of the side walls 24. The function of the conduits 34 will be described in more detail herein below.

An inner shell or housing 36 is adapted to be disposed within the lower section 16 and is comprised of a floor panel 38, opposed vertical side panels 40 and vertical end panels 42 all interconnected. One of the end panels 42 is provided with an opening 44 of the same approximate dimension and cooperable with the opening 28 in the lower section 16. The inner housing 36 is provided with a rim 46 which extends around the top surface of the side panels 40 and end panels 42 and is provided with a plurality of holes 48. The inner housing 36 is of an overall dimension smaller than the lower section 16 and the rim 46 of the inner housing 36 rests upon the rim 30 of the lower section 16. Screw or bolt means (not shown) extend through the holes 48 and 32 to rigidly connect the inner housing 36 to the lower section 16. The inner housing 36 is provided with a plurality of air holes 50 of approximately $\frac{1}{8}$th" diameter in the floor panel 38, side panels 40 and end panels 42.

The upper section 14 is connected to the lower section 16 by means of brackets or clamps (not shown). An opening 62 is provided in an end wall 54 of the upper section 14 and a door 56, constructed of wire mesh or other similar material, is hingably connected, by means of a plurality of hinges 68, over the aligned openings 52, 44, and 28 to provide an entrance and an exit means for the animal. The door 56 is secured by means of a latch 60. The upper section 14 inner housing 36 and lower section 16 are easily detached for simplified transportation.

As shown in FIG. 2, a hot air blower means 62 is connected to the conduits 34 and the blower means 62 is provided with controls for different temperature settings and air velocity settings. A timer means (not shown) is connected to or included within the blower means 62.

After a wet animal is placed within the enclosure 12 through the door 56, the blower means 62 is activated at the appropriate temperature and air velocity setting and this heated forced air flows through the conduits 34 into a space 64 between the lower section 16 and the inner housing 36. This heated air then flows through holes 48 in the inner housing 36 into the enclosure 12 which provides non-localized heated air to safely and efficiently dry the contained animal. Additional blower means 62 may be attached to the conduits 34 or additional conduits 34 is desired, and a blower means 62 may be adapted to direct heated air through the upper section 14 to dry more quickly the top portion of the contained animal.

An alternate embodiment of the present invention 10 is illustrated in FIG. 3. In this embodiment the apparatus 10 is a generally rectangular enclosure 66 having a removable flooring 68, constructed of metal or some other similar material. The enclosure 66 is formed from a plurality of interconnected conduits 70 which are all in mutual communication. A plurality of horizontal conduits 72 extend around the periphery of the enclosure 66 and are in communication with the conduits 70. The horizontal conduits 72 are spaced progressively further apart from the flooring 68 towards the upper portion of the enclosure 66 and are of a progressively smaller diameter. Vertical metal bars 74 extend around the rectangular enclosures 66 defining a cage-like configuration. A top panel 76 of the rectangular enclosure 66 is formed from a plurality of interconnected conduits 78 which are in communication with the conduits 70 and 72.

As shown in FIG. 4, the flooring 68 is provided with a plurality of holes 80 therein and a plurality of parallel conduits 82 extend under the flooring 68 and are in communication with the conduits 70. The conduits 82 have a plurality of holes 84 therein which are in alignment and in communication with the holes 80 in the flooring 68. The conduits 70, 72 and 78 all have a plurality of spaced air holes (not shown) which are directed towards the interior of the enclosures 66. At least one blower means 62 is connected through conduits 34 to the lower portion of the enclosure 66 and into communication with the conduits 70.

A wet animal is placed in the rectangular enclosure 66 through a door 86, which is pivotally connected by hinges 88 to an opening in one end panel of the rectangular enclosure 66. The door is secured by means of a latch 90. After the wet animal is placed within the rectangular enclosure 66 the blower means 62 is activated which forces heated air through the conduits 70, 72, 78 and 82 which completely envelops the animal with heated air to quickly and efficiently dry the enclosed animal.

Both embodiments of the apparatus 10 are low cost, lightweight and easily transportable. One person can quickly and completely dry a wet animal with minimal discomfort to the animal and the operator is free to handle other matters.

Whereas the present invention has been described in particular relation to the drawings attached hereto, it should be unerstood that other and further modifications of the invention, apart from those shown or suggested herein, may be made within the scope and spirit of this invention.

What is claimed is:

1. An apparatus for containing and drying an animal and comprising:

an enclosure for containing the animal, said enclosure having an upper and lower section;

said upper section being of an open cage-like configuration and attached to said lower section;

said lower section having a plurality of opposed side and end walls and having a flooring;

an inner housing disposed within said lower section and in open communication with the upper section, said inner housing having a plurality of opposed side and end panels and a flooring panel spaced from said end and side walls and said flooring of said lower section to provide a chamber therebetween;

said inner housing having a plurality of spaced holes provided therein;

means provided in said enclosure for permitting entrance and exit of the animal; and exterior means to force heated air into said chamber and through said holes in said inner housing for circulation therethrough and discharge through the upper section to dry the contained animal.

2. An apparatus as in claim 1 wherein said upper section having a plurality of opposed side and end panels and a top panel.

3. An apparatus as in claim 1 wherein said upper section constructed of interconnected bars.

4. An apparatus as in claim 1 wherein said inner housing being ready removable.

5. An apparatus as in claim 1 wherein said upper section being removable.

6. An apparatus as in claim 1 wherein said inner housing having a top rim portion extending around said side and end panels and in contact with said side and end walls of said lower section.

7. An apparatus as in claim 1 wherein said means for permitting entrance and exit of the animal being a door means.

8. An apparatus as in claim 7 wherein said enclosure being provided with an opening extending partially in one of said end panels of said upper section and in a corresponding end wall of said lower section and corresponding end panel of said inner housing with said door means covering said opening.

9. An apparatus as in claim 8 wherein said door means being constructed of interconnected bars and attached by hinge means to said enclosure.

10. An apparatus as in claim 1 wherein said means to force heated air being connected by at least one conduit to at least one opening in said lower section.

11. An apparatus as in claim 10 wherein said means to force heated air being a blower means with heating means therein.

12. An apparatus as in claim 11 wherein a timer means and temperature control means being in communication with said blower means and said heating means.

13. An apparatus for containing and drying an animal comprising:

an enclosure having a flooring panel, said enclosure being constructed of a plurality of interconnected conduits forming a top panel, and a plurality of opposed side and end panels attached to said flooring panel;

said conduits being in mutual communication;

said conduits having a plurality of holes therein directed towards the interior of the enclosure;

means in said enclosure for permitting entrance and exit of the animal; and means to force heated air into said conduits and through said holes therein to dry the contained animal.

14. An apparatus as in claim 13 wherein a certain of said conduits extending horizontally around said enclosure.

15. An apparatus as in claim 14 wherein said horizontal conduits being of progressively smaller diameters as spaced from said flooring panel.

16. An apparatus as in claim 14 wherein said horizontal conduits are spaced progressively further apart from said flooring panel.

17. An apparatus as in claim 13 wherein said enclosure having an opening therein and door means hingably covering said opening.

18. An apparatus as in claim 17 wherein said opening being in one of said end panels.

19. An apparatus as in claim 13 wherein said means to force heated air being connected to at least one of said conduits.

20. An apparatus as in claim 19 wherein said means to force heated air being a blower means with heating means therein.

21. An apparatus as in claim 20 wherein a timer means and temperature control means being in communication with said blower means and said heating means.

* * * * *